May 20, 1952      F. D. SNYDER      2,597,136
ELECTRONIC MOTOR CONTROL
Filed Feb. 21, 1947
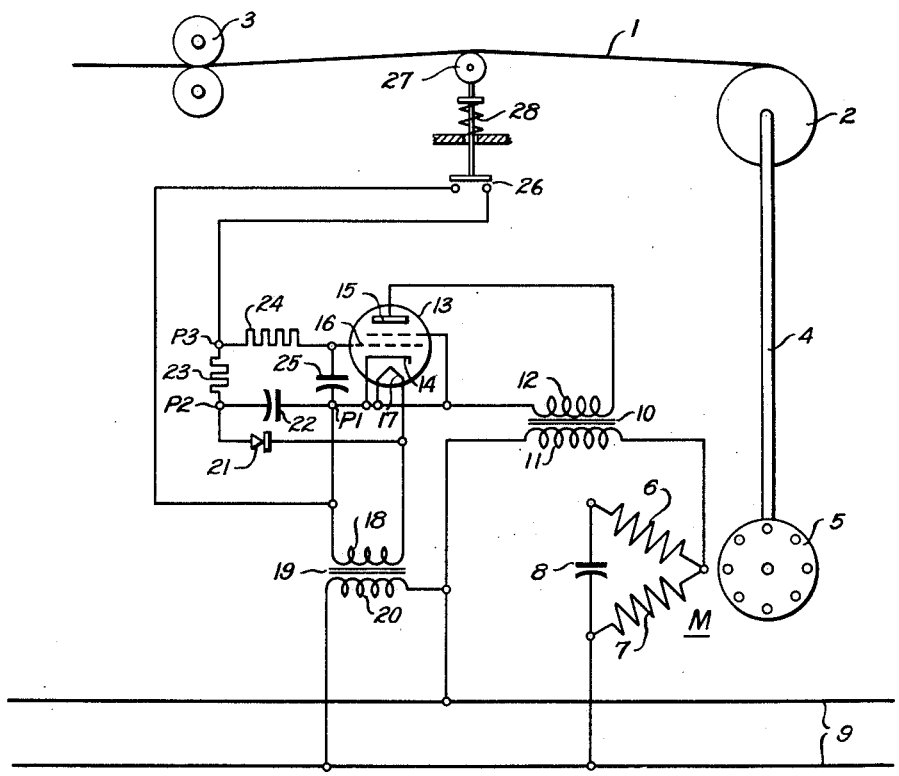
WITNESSES:
Robert C Baird
Wm. G. Groome
INVENTOR
Frederick D. Snyder.
BY
C. M. Avery
ATTORNEY

Patented May 20, 1952

2,597,136

UNITED STATES PATENT OFFICE 2,597,136

ELECTRONIC MOTOR CONTROL

Frederick D. Snyder, Milton, Mass., assignor to Westinghouse Electric Corporation, East Pittsburgh, Pa., a corporation of Pennsylvania Application February 21, 1947, Serial No. 730,150

1 Claim. (Cl. 139—110)

My invention relates to electric systems for controlling alternating-current motors to operate at subsynchronous speeds and, more particularly, to systems in which the motor is automatically controlled to adapt its operation to a given condition of performance so as to maintain it at a substantially constant value or substantially between given limit values.

In a more specific and preferred aspect, my invention concerns itself with motor control systems for wind-up, let-off and the like controls for governing the flow of flaccid material such as yarn, web, wire, sheet or strand material in textile, paper, metal and other fabricating machinery, although it should be understood that the invention is also applicable and advantageous for other uses.

It is an object of my invention to provide a control system for alternating-current motors that combines sensitivity, accuracy and reliability of operation with minimum requirements as to the number, space and design of the appertaining control devices. In particular, my invention aims at providing an electronic control apparatus for causing an alternating-current motor to run at variable subsynchronous speeds, or to maintain substantially constant torque, or substantially constant tension in the fabricating material or some other condition to be kept within narrow limit values, while requiring for such performance a minimum number of electronic control tubes, preferably only a single tube as in the embodiment described hereinafter.

Another object of my invention, in conjunction with the foregoing, is to devise the motor control circuits in such a manner that a relatively low load is imposed on the electronic control tube, even if only one tube is used, as compared with the load current of the motor controlled thereby.

Still another object, conjoint with those mentioned, is the provision of electronic speed or torque control system of sufficient overall simplicity, sufficiently high sensitivity and high speed of response to make them readily and economically applicable for multi-thread textile machines, such as looms, warpers, knitting machines and the like.

Having these objects in mind, and in accordance with one of the features of the invention, I dispose a transformer in the energizing circuit of an alternating-current motor and connect an electronic trigger tube, for instance, a thyratron, in the secondary transformer circuit so that, due to the change in transformer reactance, a motive force is imparted or not imparted to the motor, depending upon whether or not the tube is triggered or has low or high impedance. In order to obtain such a change in the conductance condition of the tube, I provide the appertaining grid circuit with a vibratory control switch which is actuated in response to the performance condition of the motor to be kept constant.

According to another feature of my invention, and with particular reference to a motor control system for wind-up or let-off devices in fabricating machinery for flaccid material, such as looms, knitting machines and other textile machinery, I provide a dancer roll or other feeler member which engages the flaccid material and causes the contact in the tube grid circuit to open and close depending upon the tension of the material engaged by the feeler member.

In accordance with still another feature of my invention, the motor appertaining to the control system is of the self-starting, single-phase type as represented, for instance, by a capacitor motor; and the transformer ratio of the above-mentioned transformer is so chosen that the motor will run when the secondary transformer circuit is loaded or virtually shorted by the conducting electronic tube, while the energization imposed on the motor is reduced to a small value insufficient to impart starting torque to the motor when the secondary transformer circuit is open due to the application of a blocking or cut-off bias on the tube grid.

The foregoing objects and features will be more fully understood from the following description of the single embodiment illustrated in the drawing.

The control system diagrammatically shown in the drawing serves to govern the let-off motion on the warp beam of a weaving loom. In order to facilitate the following explanations, I refer hereinafter, in parentheses, to numerical values concerning the rating of some circuit elements of the system. It should be understood, however, that these values may be modified within wide limits depending upon the requirements or desiderata of the intended application.

The warp material 1 is accommodated on a beam 2 and is let off from this beam in order to pass toward the shuttle (not illustrated), for instance, through guiding means, such as the set of guide rolls denoted by 3. The beam 2 is connected by a suitable transmission, here schematically represented by a shaft 4, with the armature 5 of an alternating-current motor M. The purpose of the control system is to operate the motor M at a variable speed so that the tension of the material let off from the beam 2 remains substantially constant or within a given narrow range.

The motor M is of the single-phase capacitor start induction type. It is provided with a conventional squirrel-cage winding. Its field windings are denoted by 6, 7 and the appertaining capacitor by 8. The two motor terminals are connected in an energizing circuit which extends between the two leads of an alternating-current line 9 (110 volts, 60 cycles). A transformer 10 has its primary winding 11 (rated for 110 volts) series-connected in the energizing circuit of the motor. The reactive impedance of winding 11 depends upon the impedance in the circuit of the appertaining secondary winding 12 (rated for 550 volts secondary voltage). In order to control the impedance in the circuit of the secondary winding, a controllable electronic discharge tube 13, here represented to be of the thyratron type, has its cathode 14 and anode 15 connected across the secondary winding 12 so as to derive its plate energization from the transformer 10. The control grid of the thyratron 13 is denoted by 16, and the heating filament of the cathode by 17. The filament 17 is connected across the secondary winding 18 (6.3 volts) of a separate filament transformer 19 whose primary 20 is energized from the alternating-current leads 9. The impedance of winding 12 is high when the tube 13 is not firing and low when the tube is firing.

Connected across the secondary winding 18 of the filament transformer is a series arrangement of a rectifier 21 and a capacitor 22. The capacitor 22 has a relatively high capacitance value (2 mfd.) and is preferably of the electrolytic type. The capacitor 22 forms also part of the grid circuit and, relative to that grid circuit, represents a source of unidirectional voltage, the positive pole of this source being directed toward the point marked P1 while the negative pole is directed toward the point P2. The grid circuit of tube 13 contains further a resistor 23 (30,000 ohms) in series with a resistor 24 (.25 megohms). An auxiliary capacitor 25 (.001 mfd.) is connected between cathode 14 and control grid 16.

A vibratory contact 26 is connected across the points P1 and P3 of the grid circuit so that the cathode 14 becomes directly connected to point P3 whenever the contact 26 closes. Contact 26 is controlled by a feeler member consisting of a dancer roll 27 which is biased against the warp material by a spring 28. When the tension in the material 1 is slightly above the desired value, the portion of the material extending between the beam 2 and the guide rollers 3 is relatively taut so that the dancer roll 27 is pressed against the spring 28 and causes the contact to close. When the tension of material 1 is slightly below the desired value, the dancer roll 27 moves upward to open the contact 26.

With contact 26 open, the grid 16 of thyratron 13 is negative (in the order of some 10 volts) due to the bias imposed on the grid circuit across the capacitor 22. Consequently, the tube 13 is not fired and the secondary circuit of transformer 10 is open. The primary winding 11 of transformer 10 now acts as a choke coil. As a result, the voltage effective across the terminals of motor M is extremely small (3 to 5 volts) so that the motor will not operate. As the loom weaves and uses warp, the tension in the warp 1 increases until contact 26 is closed. Then, the grid 16 is virtually transferred to point P1 so that the potential of the grid is substantially the same as that of the cathode 14. This causes the tube 13 to fire. As a result, the secondary circuit of transformer 10 is shorted and allows the primary side of transformer 10 to reduce its reactance to a negligible value. Now, virtually full line voltage is impressed on the motor and causes it to run in the let-off direction. Consequently, the material slackens and the dancer roll moves upward and opens the contact 26 thereby stopping the motor.

Actually, when the warp is used at a constant rate, the contact 26 opens and closes very rapidly in a vibratory manner as a movement of only a few thousandths of an inch suffices to switch the contact. Consequently, the motor M receives a quick succession of very many energizing kicks during a second. The resultant movement of the motor M, as to its average or effective speed, may assume any necessary value below the synchronous motor speed, and this effective speed value is the one needed to just feed the correct amount of warp. The speed value thus obtained will vary depending upon the diameter of the woven material on the beam 2 and also depending on the speed at which the cloth is being woven.

A particular advantage of the above described control system according to the invention is the fact that it is exceedingly simple and yet affords an electronic control of the motor within a wide continuous speed range while using but a single thyratron tube. Referring to the parenthetical examples of rated values given in the foregoing, it will also be recognized that when using a 5:1 ratio transformer, the output of the secondary high voltage side of the transformer in amperes is only one-fifth of the current flowing through the motor. Therefore, the thyratron is loaded by only 0.6 amperes while the motor will draw a maximum of 3 amperes. These ratios may, of course, be modified without foregoing the just-mentioned advantages. In general, the transformer ratio is to be chosen so that the secondary voltage, when the secondary is open (that is, when the tube is not firing), is within the back or blocking voltage rating of the tube. For instance, if the motor is rated for 1 ampere, 110 volts and the tube is good for 600 volts back voltage, the transformer ratio should be such that the peak secondary voltage is below 600 volts. Preferably, the highest ratio satisfying this condition is chosen so as to obtain the lowest current through the tube when the tube is firing. For instance, if instead of the above-given numerical example, the transformer ratio is 4 to 1 when the tube fires and then when a current of 1 ampere flows through the motor and transformer primary, the current in the tube and in the transformer secondary is only 0.25 amperes.

While I have described in detail a let-off motion control, the invention is similarly applicable for take-up drives and any application involving the winding, unwinding or transporting of a material at variable speeds in dependence upon any operating condition controlled by the motor and translatable into the opening and closing of a vibratory contact.

It will be understood by those skilled in the art that control systems according to my invention may be modified as to values and details without departing from the objects and principles of the invention and within the scope of the essential features as set forth in the claim annexed hereto.

I claim as my invention:

A control for a material let-off member comprising, a single-phase induction motor of the self-starting type for controlling the let-off movement of said member, a transformer having a primary winding connected in series with said motor and having a secondary winding for varying the reactance of said primary winding between motor-running and motor-stopping values depending upon whether said secondary winding is substantially shorted or opened respectively, a single electronic trigger tube plate-connected across said secondary winding to be energized thereby, said tube having a control grid, a resistor connected in series with said control grid, a grid biasing circuit including a capacitor chargeable to a predetermined grid biasing potential, the negative terminal of said capacitor being connected to said resistor forming a series circuit therewith, contact means connected across said resistor and said capacitor, and tension-responsive control means for engagement with the material let-off from said member and connected with said contact means to actuate the latter in dependence of changes in tension of the material to cause said motor to actuate said member for substantially constant tension of the let-off material.

FREDERICK D. SNYDER.

REFERENCES CITED

The following references are of record in the file of this patent:

UNITED STATES PATENTS

| Number | Name | Date |
| --- | --- | --- |
| 807,721 | Carver | Dec. 19, 1905 |
| 1,954,884 | Mears | Apr. 17, 1934 |
| 2,102,911 | Perry | Dec. 21, 1937 |
| 2,116,586 | Stoller | May 10, 1938 |
| 2,202,172 | Stoller | May 28, 1940 |
| 2,437,301 | Lobasco | Mar. 9, 1948 |
| 2,450,470 | Dion | Oct. 5, 1948 |